US008822620B2

(12) United States Patent
Hergenrother et al.

(10) Patent No.: US 8,822,620 B2
(45) Date of Patent: *Sep. 2, 2014

(54) METHOD FOR MAKING ALKOXY-MODIFIED SILSESQUIOXANES

(75) Inventors: William L. Hergenrother, Akron, OH (US); James H. Pawlow, Akron, OH (US); Terrence E. Hogan, Akron, OH (US); Ashley S. Hilton, Massillon, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,611

(22) Filed: Feb. 18, 2011

(65) Prior Publication Data
US 2011/0144235 A1 Jun. 16, 2011

Related U.S. Application Data

(62) Division of application No. 11/752,715, filed on May 23, 2007, now Pat. No. 7,915,368.

(51) Int. Cl.
C08G 77/08 (2006.01)

(52) U.S. Cl.
USPC ............................................. 528/12; 528/20

(58) Field of Classification Search
USPC ..................................................... 528/12, 20
See application file for complete search history.

(56) References Cited

U.S. PATENT DOCUMENTS

| | | |
|---|---|---|
| 2,462,640 A | 2/1949 | Hyde |
| 3,186,965 A | 6/1965 | Plueddemanu |
| 3,304,318 A | 2/1967 | Brady |
| 3,428,706 A | 2/1969 | Jasinski et al. |
| 3,647,740 A | 3/1972 | Lorce et al. |
| 3,734,763 A | 5/1973 | Plueddemann |
| 3,816,493 A | 6/1974 | Nitzsche et al. |
| 4,052,524 A | 10/1977 | Harakas et al. |
| 4,101,460 A | 7/1978 | Small et al. |
| 4,258,770 A | 3/1981 | Davis et al. |
| 4,269,741 A | 5/1981 | Hornan |
| 4,340,515 A | 7/1982 | Frassek et al. |
| 4,424,297 A | 1/1984 | Bey |
| 4,441,946 A | 4/1984 | Sharma |
| 4,512,897 A | 4/1985 | Crowder, III et al. |
| 4,694,040 A | 9/1987 | Hashimoto et al. |
| 4,745,145 A | 5/1988 | Schonfeld et al. |
| 4,822,681 A | 4/1989 | Schossler et al. |
| 4,847,162 A | 7/1989 | Haluska et al. |
| 4,889,747 A | 12/1989 | Wilson |
| 5,015,717 A | 5/1991 | Martin et al. |
| 5,162,409 A | 11/1992 | Mroczkowski |
| 5,359,022 A | 10/1994 | Mautner et al. |
| 5,363,994 A | 11/1994 | Angeline |
| 5,447,971 A | 9/1995 | Bergh et al. |
| 5,484,867 A | 1/1996 | Lichtenhan et al. |
| 5,534,592 A | 7/1996 | Halasa et al. |
| 5,552,476 A | 9/1996 | Halling |
| 5,650,474 A | 7/1997 | Yamaya et al. |
| 5,684,113 A | 11/1997 | Nakanishi et al. |
| 5,750,197 A | 5/1998 | van Ooij et al. |
| 5,750,610 A | 5/1998 | Burns et al. |
| 5,763,388 A | 6/1998 | Lightsey et al. |
| 5,830,934 A | 11/1998 | Krishnan |
| 5,844,060 A | 12/1998 | Furuya et al. |
| 5,854,369 A | 12/1998 | Geck et al. |
| 5,907,015 A | 5/1999 | Sexsmith |
| 5,914,364 A | 6/1999 | Cohen et al. |
| 5,916,973 A | 6/1999 | Zimmer et al. |
| 5,929,149 A | 7/1999 | Matsuo et al. |
| 5,932,757 A | 8/1999 | Standke et al. |
| 5,958,161 A | 9/1999 | Grimberg et al. |
| 5,969,057 A | 10/1999 | Schoeley et al. |

(Continued)

FOREIGN PATENT DOCUMENTS

| | | |
|---|---|---|
| CN | 101180344 A | 5/2008 |
| EP | 0025840 A1 | 4/1981 |

(Continued)

OTHER PUBLICATIONS

Nazina, Elena E., Mar. 22, 2010 Office Action from corresponding Russian Patent Application No. 2007139319 (6 pp.).

Xue, Haijiao, English translation of Apr. 27, 2010 First Office Action from corresponding Chinese Patent Application No. 200680018058.2 (11 pp.).

(Continued)

*Primary Examiner* — Kuo-Liang Peng

(74) *Attorney, Agent, or Firm* — Meredith Hooker; Nathan T. Lewis

(57) ABSTRACT

A method is presented for making alkoxy-modified silsesquioxanes (AMS) or co-alkoxy-modified silsesquioxanes (co-AMS,) comprising the steps of (a) combining as a reaction mixture (i) water, (ii) an acid-stable solvent for the water, (iii) a solid strong cationic hydrolysis and condensation catalyst, and (iv) a trialkoxysilane compound, (b) allowing the reaction mixture to react for about 0.5 hours to about 200 hours to form the alkoxy-modified silsesquioxanes; and (c) recovering the alkoxy-modified silsesquioxanes from the reaction mixture. The use of solid strong cationic catalysts in this reaction system is advantageous because they remain as solids throughout the reaction, allowing simplified separation of the solid catalyst from the soluble AMS or co-AMS products, resulting in total or near total recovery of the AMS or co-AMS products, the products being free of, or substantially free of residual acid catalyst, as well as virtual total recovery of the catalyst for recycling. The improved AMS and co-AMS compounds, vulcanizable rubber compounds containing them, and a pneumatic tire having a component made from the vulcanized rubber compounds are also presented.

21 Claims, No Drawings

(56) References Cited

U.S. PATENT DOCUMENTS

| | | |
|---|---|---|
| 5,985,371 A | 11/1999 | Fujioka et al. |
| 5,985,953 A | 11/1999 | Lightsey et al. |
| 6,015,850 A | 1/2000 | Nakamura et al. |
| 6,033,597 A | 3/2000 | Yatsuyanagi et al. |
| 6,048,910 A | 4/2000 | Furuya et al. |
| 6,087,519 A | 7/2000 | Garnier et al. |
| 6,124,491 A | 9/2000 | Wolter et al. |
| 6,127,468 A | 10/2000 | Cruse et al. |
| 6,140,447 A | 10/2000 | Gay et al. |
| 6,162,547 A | 12/2000 | van Ooij et al. |
| 6,191,247 B1 | 2/2001 | Ishikawa et al. |
| 6,204,339 B1 | 3/2001 | Waldman et al. |
| 6,232,424 B1 | 5/2001 | Zhong et al. |
| 6,239,243 B1 | 5/2001 | Deng et al. |
| 6,271,331 B1 | 8/2001 | Gay et al. |
| 6,294,007 B1 | 9/2001 | Martin |
| 6,313,205 B1 | 11/2001 | Chiron et al. |
| 6,326,424 B1 | 12/2001 | Louis et al. |
| 6,331,605 B1 | 12/2001 | Lunginsland et al. |
| 6,361,871 B1 | 3/2002 | Jenkner et al. |
| 6,372,843 B1 | 4/2002 | Barruel et al. |
| 6,399,210 B1 | 6/2002 | Zhong |
| 6,414,061 B1 | 7/2002 | Cruse et al. |
| 6,426,378 B1 | 7/2002 | Lickes et al. |
| 6,429,245 B1 | 8/2002 | Francik et al. |
| 6,433,065 B1 | 8/2002 | Lin et al. |
| 6,433,077 B1 | 8/2002 | Craig et al. |
| 6,455,158 B1 | 9/2002 | Mei et al. |
| 6,465,670 B2 | 10/2002 | Thise et al. |
| 6,465,671 B1 | 10/2002 | Bae et al. |
| 6,528,673 B2 | 3/2003 | Cruse et al. |
| 6,548,573 B1 | 4/2003 | Rempert |
| 6,548,594 B2 | 4/2003 | Luginsland et al. |
| 6,573,356 B2 | 6/2003 | Araki et al. |
| 6,608,125 B2 | 8/2003 | Cruse et al. |
| 6,611,518 B1 | 8/2003 | Ngo et al. |
| 6,624,214 B2 | 9/2003 | Zimmer et al. |
| 6,624,237 B2 | 9/2003 | Biteau et al. |
| 6,635,700 B2 | 10/2003 | Cruse et al. |
| 6,649,684 B1 | 11/2003 | Okel |
| 6,653,365 B2 | 11/2003 | Jia |
| 6,660,823 B1 | 12/2003 | Lichtenhan et al. |
| 6,683,135 B2 | 1/2004 | Cruse et al. |
| 6,689,834 B2 | 2/2004 | Ackermann et al. |
| 6,696,155 B1 | 2/2004 | Takano et al. |
| 6,727,339 B2 | 4/2004 | Luginsland et al. |
| 6,767,930 B1 | 7/2004 | Svejda et al. |
| 6,770,724 B1 | 8/2004 | Lichtenhan et al. |
| 6,774,202 B2 | 8/2004 | Lee |
| 6,774,569 B2 | 8/2004 | de Vries et al. |
| 6,811,684 B2 | 11/2004 | Mohr et al. |
| 6,821,632 B2 | 11/2004 | Topp et al. |
| 6,830,826 B2 | 12/2004 | Brabant et al. |
| 6,841,197 B2 | 1/2005 | Standke et al. |
| 6,852,794 B2 | 2/2005 | Puhala et al. |
| 6,878,768 B2 | 4/2005 | Tardivat et al. |
| 6,890,981 B1 | 5/2005 | Luginsland |
| 6,903,150 B2 | 6/2005 | Zimmer et al. |
| 6,911,518 B2 | 6/2005 | Lichtenhan et al. |
| 6,919,469 B2 | 7/2005 | Van Ooij et al. |
| 6,927,270 B2 | 8/2005 | Lichtenhan et al. |
| 6,936,663 B1 | 8/2005 | Modisette |
| 6,972,312 B1 | 12/2005 | Lichtenhan et al. |
| 7,119,150 B2 | 10/2006 | Lin et al. |
| 7,201,944 B2 | 4/2007 | Hergenrother et al. |
| 7,294,669 B2 | 11/2007 | Ito |
| 7,393,564 B2 | 7/2008 | Hergenrother et al. |
| 7,432,321 B2 | 10/2008 | Joshi et al. |
| 7,550,547 B2 | 6/2009 | Wakabayashi et al. |
| 7,732,016 B2 | 6/2010 | van Ooij et al. |
| 7,799,870 B2 | 9/2010 | Hergenrother et al. |
| 7,915,368 B2 * | 3/2011 | Hergenrother et al. ......... 528/12 |
| 8,029,906 B2 | 10/2011 | van Ooij et al. |
| 8,097,674 B2 | 1/2012 | Hergenrother et al. |
| 8,288,474 B2 | 10/2012 | Hergenrother et al. |
| 8,513,371 B2 | 8/2013 | Hergenrother et al. |
| 2001/0011046 A1 | 8/2001 | Ichikawa et al. |
| 2002/0055011 A1 | 5/2002 | Brabant et al. |
| 2002/0055564 A1 | 5/2002 | Cruse et al. |
| 2002/0061409 A1 | 5/2002 | Topp et al. |
| 2002/0151616 A1 | 10/2002 | Ozai et al. |
| 2003/0055193 A1 | 3/2003 | Lichtenhan et al. |
| 2003/0059393 A1 | 3/2003 | Wrolson et al. |
| 2003/0088034 A1 | 5/2003 | Luginsland et al. |
| 2003/0130388 A1 | 7/2003 | Luginsland et al. |
| 2003/0199619 A1 | 10/2003 | Cruse |
| 2004/0042880 A1 | 3/2004 | Lee |
| 2004/0042980 A1 | 3/2004 | Kanji et al. |
| 2004/0122180 A1 | 6/2004 | Hergenrother et al. |
| 2004/0210001 A1 | 10/2004 | Cruse et al. |
| 2004/0266968 A1 | 12/2004 | Korth et al. |
| 2005/0009982 A1 | 1/2005 | Inagaki et al. |
| 2005/0010012 A1 | 1/2005 | Jost et al. |
| 2005/0079364 A1 | 4/2005 | van Ooij et al. |
| 2005/0244659 A1 | 11/2005 | Higuchi et al. |
| 2005/0277717 A1 | 12/2005 | Joshi et al. |
| 2006/0083925 A1 | 4/2006 | Laine et al. |
| 2006/0086450 A1 | 4/2006 | Hogan et al. |
| 2006/0089446 A1 | 4/2006 | Lin et al. |
| 2006/0089504 A1 | 4/2006 | Ito et al. |
| 2006/0115657 A1 | 6/2006 | Griswold |
| 2006/0147731 A1 | 7/2006 | Grimberg et al. |
| 2006/0210813 A1 | 9/2006 | Fath et al. |
| 2006/0217473 A1 | 9/2006 | Hergenrother et al. |
| 2007/0059448 A1 | 3/2007 | Smith et al. |
| 2007/0275255 A1 | 11/2007 | Ooms et al. |
| 2008/0293858 A1 | 11/2008 | Hergenrother et al. |
| 2009/0005481 A1 | 1/2009 | Ishida et al. |
| 2009/0165913 A1 | 7/2009 | Hergenrother et al. |
| 2009/0171014 A1 | 7/2009 | Hergenrother et al. |
| 2009/0181248 A1 | 7/2009 | van Ooij et al. |
| 2009/0203929 A1 | 8/2009 | Hergenrother et al. |
| 2009/0326255 A1 | 12/2009 | Hergenrother et al. |
| 2010/0071818 A1 | 3/2010 | Hergenrother et al. |

FOREIGN PATENT DOCUMENTS

| | | |
|---|---|---|
| EP | 1995267 A2 | 11/2008 |
| JP | 6306173 A | 11/1994 |
| JP | 7292108 A | 11/1995 |
| JP | 08155287 A | 6/1996 |
| JP | 10059984 A | 3/1998 |
| JP | 10292048 A | 11/1998 |
| JP | 11343366 | 12/1999 |
| JP | 2001-205187 A | 7/2001 |
| JP | 2002-138164 | 5/2002 |
| JP | 2002138164 A | 5/2002 |
| JP | 2004-521992 A | 7/2004 |
| JP | 2005-029771 A | 2/2005 |
| JP | 2006137821 A | 6/2006 |
| JP | 2006285017 A | 10/2006 |
| JP | 2007008987 A | 1/2007 |
| KR | 20020078721 A | 10/2002 |
| WO | 03091314 A1 | 11/2003 |
| WO | 2005-093002 | 10/2005 |
| WO | 2006-031434 | 3/2006 |
| WO | 2006102518 A1 | 9/2006 |
| WO | 2008-025846 | 3/2008 |
| WO | 2009-085181 | 7/2009 |

OTHER PUBLICATIONS

Peng, Kuo Liang, May 18, 2010 Office Action from corresponding U.S. Appl. No. 11/752,715 (7 pp.).

Salvitti, Michael A., Sep. 2, 2010 Final Office Action from corresponding U.S. Appl. No. 12/344,804 (14 pp.).

Zimmer, Marc S., Oct. 5, 2010 Office Action from corresponding U.S. Appl. No. 12/347,017 (10 pp.).

Peng, Kuo Liang, Nov. 18, 2010 Notice of Allowance from corresponding U.S. Appl. No. 11/752,715 (5 pp.).

Salvitti, Michael A., Dec. 27, 2010 Advisory Action from corresponding U.S. Appl. No. 12/344,804 (7 pp.).

Zimmer, Marc S., Apr. 21, 2011 Notice of Allowance from corresponding U.S. Appl. No. 12/347,017 (5 pp.).

(56) References Cited

OTHER PUBLICATIONS

Hergenrother, William L. et al., U.S. Appl. No. 12/344,804, filed Dec. 29, 2008 entitled "Methods of Making Blocked-Mercapto Alkoxy-Modified Silsesquioxane Compounds".
Hergenrother, William L. et al., U.S. Appl. No. 12/346,994, filed Dec. 31, 2008 entitled "Amino Alkoxy-Modified Silsesquioxanes and Method of Preparation".
Hergenrother, William L. et al., U.S. Appl. No. 12/347,017, filed Dec. 31, 2008 entitled "Amino Alkoxy-Modified Silsesquioxanes in Silica-Filled Rubber With Low Volatile Organic Chemical Evolution".
Hergenrother, William L. et al., U.S. Appl. No. 12/347,047, filed Dec. 31, 2008 entitled "Method for Making Alkoxy-Modified Silsesquioxanes and Amino Alkoxy-Modified Silsesquioxanes".
Hergenrother, William L. et al., U.S. Appl. No. 12/347,086, filed Dec. 31, 2008 entitled "Amino Alkoxy-Modified Silsesquioxane Adhesives for Improved Metal Adhesion and Metal Adhesion Retention to Cured Rubber".
Peng, KuoLiang, May 11, 2011 Office Action from U.S. Appl. No. 12/347,047 (8 pp.).
Xue, Haijiao, May 19, 2011 Office Action with English translation from Chinese Patent Application No. 200680018058.2 (9 pp.).
Salvitti, Michael A., May 26, 2011 Office Action from U.S. Appl. No. 12/344,804 (11 pp.).
Peng, KuoLiang, Jun. 16, 2011 Office Action from U.S. Appl. No. 12/346,994 (10 pp.).
Brown, Jr., John F. et al., "The Polycondensation of Phyenlsilanetriol", Journal of the American Chemical Society, vol. 87, No. 19, pp. 4317-4324 (Oct. 5, 1965).
Dittmar, Uwe et al., "Funktionalisierte Octa-(propylsilsesquioxane)(3-$XC_3H_6$)$_8$($Si_8O_{12}$) Modellverbindungen fur oberflachenmodifizierte Kieselgele", Journal of Organometallic Chemistry, 489 pp. 185-194, (1995) [with English translation].
Dzhafarov, A.A. et al., "Synthesis and Properties of Organosilicon, Organogermanium, and Organotin Compounds [2-(Arylthio)Ethyl]-Silanes, -Germanes, and -Stannanes", Kalinin State University, Institute of Oil-Additive Chemistry, Academy of Sciences of the Azerbaidzhan SSR. Translated from Zhurnal Obshchei Khimii, vol. 45, No. 9, pp. 2023-2025, Sep. 1975.
Hergenrother, William L. et al., "Reduction of Volatile Organic Compound Emission. I. Synthesis and Characterization of Alkoxy-Modified Silsesquioxane", Journal of Applied Polymer Science, vol. 115, pp. 79-90 (2010).
Joshi, Mangala et al., "Polymeric Nanocomposites—Polyhedral Oligomeric Silsesquioxanes (POSS) as Hybrid Nanofiller", Journal of Macromolecular Science, Part C—Polymer Reviews, vol. 44, No. 4, pp. 389-410 (2004).
Nuss, A.J. et al., Decision of Technical Board of Appeal 3.3.1 dated Feb. 12, 1998, T990/96-3.3.1 (pp. 1-12).
Rikowski, Eckhard et al., "Cage-rearrangement of silsesquioxanes", Polyhedron, vol. 16, No. 19, pp. 3357-3361 (1997).
van Ooij, W.J., "Mechanism and Theories of Rubber Adhesion to Steel Tire Cords", Rubber Chemistry and Technology, vol. 57, No. 3, pp. 421-456 (1984).
Yu, Libing et al., "Preparation, Characterization, and Synthetic Uses of Lanthanide (III) Catalysts Supported on Ion Exchange Resins," J. Org. Chem., 62, pp. 3575-3581 (1997).
Product brochure, Gelest, Inc., "PolySilsesquioxanes and T-Resins $RSiO_{1.5}$", pp. 39-42, (2004).
Boiling Point Calculator from the web site http://www.partyman.se/boiling-point-calculator, downloaded Nov. 10, 2009 (2 pp.).
Boiling Point Calculator from the web site http://www.trimen.pl/witek/calculators/wrzenie.html, downloaded Nov. 10, 2009 (2 pp.).
Database WPI Week 200026, Thomson Scientific, London, GB; AN 2000-298587, XP-002573380, & JP2000-086766, Mar. 28, 2000 (2 pp.).
Zimmer, Marc S., Jun. 26, 2009 Office Action from U.S. Appl. No. 11/387,569 (6 pp.).
Zimmer, Marc S., Nov. 20, 2009 Final Office Action from U.S. Appl. No. 11/387,569 (6 pp.).
Salvitti, Michael A., Apr. 29, 2010 Office Action from corresponding U.S. Appl. No. 12/344,804 (11 pp.).
Buestrich, Ralf, Apr. 15, 2008 Office Action from corresponding European Patent Application No. 06739416.3 (3 pp.).
Buestrich, Ralf, Aug. 17, 2009 Office Action from corresponding European Patent Application No. 06739416.3 (4 pp.).
Buestrich, R., Jul. 24, 2006 International Search Report from PCT Patent Application No. PCT/US2006/010610 (2 pp.).
Cho, Han Sol, Apr. 20, 2010 International Search Report from PCT/US2009/069587 [4 pp.].
Peng, Kuo Liang, Nov. 17, 2011 Final Office Action from U.S. Appl. No. 12/347,047 (10 pp.).
Peng, Kuo Liang, Nov. 18, 2011 Final Office Action from U.S. Appl. No. 12/346,994 (10 pp.).
Salvitti, Michael A., Nov. 25, 2011 Final Office Action from U.S. Appl. No. 12/344,804 (15 pp.).
Sheh, Anthony H., Feb. 6, 2012 Office Action from U.S. Appl. No. 12/347,086 (12 pp.).
Kamimura, N., English translation of Feb. 7, 2012 Office Action from Japanese Patent Application No. 2008-503194 (7 pp.).
Peng, Kuo Liang, Mar. 1, 2012 Office Action from U.S. Appl. No. 12/347,047 (7 pp.).
Peng, Kuo Liang, Mar. 2, 2012 Office Action from U.S. Appl. No. 12/346,994 (8 pp.).
Jin, Ma, English translation of Apr. 5, 2012 Office Action from Chinese Application No. 200810214703.9 (5 pp.).
Salvitti, Michael A., Apr. 6, 2012 Advisory Action from U.S. Appl. No. 12/344,804 (8 pp.).
English translation of Apr. 6, 2012 Office Action from Chinese Application No. 200910161911.1 (7 pp.).
Buestrich, Ralf, Apr. 23, 2012 Office Action from European Patent Application No. 10075613.9 (6 pp.).
Buestrich, Ralf, Apr. 24, 2012 Office Action from European Patent Application No. 06739416.3 (6 pp.).
Zimmer, Marc S., Jun. 21, 2012 Notice of Allowance from U.S. Appl. No. 12/883,778 (4 pp.).
Loewe, Robert S., Jun. 25, 2012 Office Action from U.S. Appl. No. 13/174,129 (7 pp.).
Peng, Kuo Liang, Aug. 9, 2012 Final Office Action from U.S. Appl. No. 12/346,994 (7 pp.).
Loewe, Robert S., Oct. 15, 2012 Final Office Action from U.S. Appl. No. 13/174,129 ( 8 pp.).
Loewe, Robert S., Jan. 31, 2013 Office Action from U.S. Appl. No. 13/174,129 ( 8 pp.).
Baney, Ronald H. et al., "Silsesquioxanes," Chem. Rev. vol. 95, pp. 1409-1430 (1995).
Grubb, W.T., "A Rate Study of the Silanol Condensation Reaction at 25 in Alcoholic Solvents," J. Am. Chem. Soc., vol. 76, pp. 3408-3414 (Jul. 5, 1954).
Li, Guizhi et al., "Polyhedral Oligomeric Silsesquioxane (POSS) Polymers and Copolymers: A Review," Journal of Inorganic and Organometallic Polymers, vol. 11, No. 3, pp. 123-154 (2002).
Zimmer, Marc S., Feb. 15, 2012 Office Action from U.S. Appl. No. 12/883,778 (8 pp.).
Peng, Kuo Liang, Aug. 9, 2012 Final Office Action from U.S. Appl. No. 12/347,047 (7 pp.).
Oct. 12, 2012 Office Action with English translation from Chinese Application No. 200910161911.1 (9 pp.).
Jin, Ma, Jan. 6, 2013 Office Action with English translation from Chinese Application No. 200810214703.9 (6 pp.).
Kamimura, N., Feb. 5, 2013 Office Action with English translation from Japanese Application No. 2008-503194 (7 pp.).
Mar. 4, 2013 Office Action with English translation from Chinese Application No. 200980157744.1 (16 pp.).
Peng, Kuo Liang, Apr. 10, 2013 Notice of Allowance from U.S. Appl. No. 12/346,994 (10 pp.).
Shinawaga, Yoko, May 7, 2013 Office Action with English translation from Japanese Application No. 2008-134163 (9 pp.).
Loewe, Robert S., May 9, 2013 Office Action from U.S. Appl. No. 13/174,129 (6 pp.).
Chinese Patent Office, May 30, 2013 Office Action with English translation from Chinese Application No. 200910161911 (8 pp.).

(56) References Cited

OTHER PUBLICATIONS

Barrere, Matthieu, May 31, 2013 European Search Report from European Application No. 09837079.4 (8 pp.).
Salvitti, Michael A., Jun. 10, 2013 Office Action from U.S. Appl. No. 12/344,804 (17 pp.).
Loewe, Robert S., Aug. 16, 2013 Advisory Action from U.S. Appl. No. 13/174,129 (3 pp.).
Kitazawa, K., Sep. 17, 2013 Office Action with English translation from Japanese Application No. 2009-182924 (8 pp.).
Shinawaga, Y., Oct. 8, 2013 Office Action with English translation from Japanese Application No. 2008-134163 (5 pp.).
Chinese Patent Office, Nov. 7, 2013 Office Action with English translation from Chinese Application No. 2009101619111 (8 pp.).
Zimmer, Marc S., Nov. 20, 2013 Office Action from U.S. Appl. No. 13/652,271 (8 pp.).

* cited by examiner

METHOD FOR MAKING ALKOXY-MODIFIED SILSESQUIOXANES

CROSS-REFERENCE TO RELATED APPLICATIONS

This application is a divisional of U.S. Ser. No. 11/752,715, filed May 23, 2007, now U.S. Pat. No. 7,915,368, which is hereby incorporated by reference.

BACKGROUND OF THE INVENTION

As the present trend in tire-making technology continues toward the use of higher silica loadings in rubber compounds, there is a challenge to contain levels of environmentally released volatile organic compounds (VOC), especially alcohol, during compounding, processing, cure and storage of silica-reinforced rubbers.

In our U.S. patent application Ser. No. 11/387,569, filed Mar. 23, 2006, entitled "Compounding Silica-Reinforced Rubber With Low Volatile Organic Compound (VOC) Emission," the entire disclosure of which is hereby incorporated by reference, we described the preparation of alkoxy-modified silsesquioxane (AMS) compounds and co-alkoxy-modified silsesquioxane (co-AMS) compounds that generate less alcohol than conventional alkoxysilane-containing silica-coupling and/or silica dispersing agents used in rubber compounding. In addition to improved environmental conditions in the plant, the decreased amount of alcohol produced when using the AMS and co-AMS compounds results in vulcanized rubber compounds having one or more improved properties such as, but not limited to, enhanced rubber reinforcement, increased polymer-filler interaction and lower compound viscosity, providing for tires having improved wet and snow traction, lower rolling resistance, increased rebound and decreased hysteresis.

In the aforementioned patent application, we described AMS and co-AMS compounds that can be made by subjecting one or more trialkoxysilanes or trichlorosilanes to hydrolysis and condensation in an aqueous alcohol solution in the presence of a hydrolysis and condensation catalyst such as, but not limited to, a strong acid (e.g., hydrochloric acid, sulfuric acid, phosphoric acid, and the like), a strong base (e.g., sodium hydroxide, potassium hydroxide, lithium hydroxide, and the like), a strong organic acid, and a strong organic base (e.g. hindered amine bases, guanidines, and the like). The AMS or co-AMS product can be removed from the reaction mixture, such as by phase separation, filtration, and/or extraction with water and an organic solvent, and the like. The product can then be dried to remove substantially any organic solvent and water remaining in the reaction mixture.

When a strong liquid acid, base, organic acid or organic base is used as the hydrolysis and condensation catalyst, carryover of the liquid catalyst in the precipitated AMS or co-AMS product can require special treatment for its removal. Therefore, an alternative method for making AMS or co-AMS products is here presented.

SUMMARY OF THE INVENTION

It has been unexpectedly discovered that inorganic solid acids including, but not limited to, solid strong cationic resins such as those used for cationic ion exchange chromatography in, for example, the petroleum industry, can be employed as the hydrolysis and condensation catalyst in the production of the AMS and/or co-AMS compounds when a strong acid is desired as the catalyst. The use of such solid strong cationic catalysts in this reaction system is advantageous because they remain as solids throughout the reaction, allowing simplified separation of the solid catalyst from the soluble AMS or co-AMS products, resulting in total or near total recovery of the AMS or co-AMS products without acid carryover, as well as virtual total recovery of the catalyst for recycling.

In particular, a method is presented for making alkoxy-modified silsesquioxanes or co-alkoxy-modified silsesquioxanes, comprising the steps of (a) combining as a reaction mixture (i) water, (ii) an acid-stable solvent for the water, (iii) a solid strong cationic hydrolysis and condensation catalyst, and (iv) a trialkoxysilane compound, (b) allowing the reaction mixture to react for about 0.5 hours to about 200 hours to form the alkoxy-modified silsesquioxanes; and (c) recovering the alkoxy-modified silsesquioxanes from the reaction mixture. The resulting products consist essentially of a mixture of alkoxy-modified silsesquioxanes having an open structure with a reactive alkoxysilyl group, and are essentially free of closed caged polyhedral organosilsesquioxanes. Further, the resulting products are free of, or substantially free of, residual acid catalyst. The method can further comprise the step of recovering the solid strong cationic catalyst from the reaction mixture for recycling the catalyst.

The invention also encompasses an improved alkoxy-modified silsesquioxane obtained by a method according to the invention, wherein the alkoxy-modified silsesquioxane is free of, or substantially free of, residual acid catalyst; and a vulcanizable rubber compound comprising an elastomer, a reinforcing filler comprising silica or a mixture thereof with carbon black, a silica dispersing aid comprising an improved alkoxy-modified silsesquioxane rubber obtained by a method according to the invention, wherein the alkoxy-modified silsesquioxane is free of, or substantially free of, residual acid catalyst, and a cure agent. The invention further encompasses a pneumatic tire including at least one component comprising a vulcanized rubber made from the vulcanizable rubber compound.

DETAILED DESCRIPTION OF THE INVENTION

A method is presented for making an alkoxy-modified silsesquioxane comprising one or more compounds selected from the group consisting of alkoxy-modified silsesquioxanes having the formula

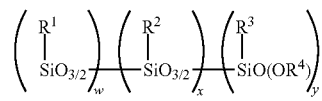

and mixtures, thereof, wherein w, x and y represent mole fractions, y does not equal zero, either w or x but not both can be zero, and w+x+y=1.00, the method comprising the steps of:

(a) combining as a reaction mixture (i) water, (ii) an acid-stable solvent for the water, (iii) a solid strong cationic hydrolysis and condensation catalyst, and (iv) an R-trialkoxysilane,
wherein R comprises a group bonded to the silicon atom and is independently selected from the group consisting of $R^1$, $R^2$ and $R^3$, wherein $R^1$, $R^2$ and $R^3$ are the same or different and selected from the group consisting of (i) H or an alkyl group having one to about 20 carbon atoms, (ii) cycloalkyl groups having 3 to about 20 carbon atoms, (iii) alkylaryl groups having 7 to about 20 carbon atoms, and (iv) $R^5X$, wherein X is selected from the group consisting of Cl, Br, SH, $S_aR^6$, $NR^6_2$, $OR^6$, $CO_2H$, $SCOR^6$, $CO_2R^6$, OH, olefins, epoxide, amino groups, vinyl groups, acrylates and methacrylates, wherein a=2 to about 8, $R^5$ is selected from the group consisting of alkylene groups having one to about 20 carbon atoms, cycloalkylene groups having 3 to about 20 carbon atoms, and $R^4$ and $R^6$ are selected from the group consisting of alkyl groups having one to about 20 carbon atoms, cycloalkyl groups having 3 to about 20 carbon atoms, and alkylaryl groups having 7 to about 20 carbon atoms;

(b) allowing the reaction mixture to react for about 0.5 hours to about 200 hours to form the alkoxy-modified silsesquioxanes; and (c) recovering the alkoxy-modified silsesquioxanes from the reaction mixture.

When produced according to the method, the recovered alkoxy-modified silsesquioxanes consist essentially of a mixture of alkoxy-modified silsesquioxanes having an open structure with a reactive alkoxysilyl group, and are essentially free of closed caged polyhedral organosilsesquioxanes. Further, the recovered silsesquioxanes are free of, or substantially free of, residual acid catalyst.

In general, the AMS or co-AMS compound(s) can be made by subjecting one or more trialkoxysilanes to hydrolysis and condensation in an aqueous alcohol solution in the presence of a solid strong cationic catalyst. The reaction is continued for a period of time sufficient for substantial total conversion of the trialkoxysilane(s) to the AMS or co-AMS compounds. As described below, it has been found that the rate of conversion of the reactants to the final product can be controlled by the concentration of the reactants (trialkoxysilane(s), acid and water), as well as the ratio of the trialkoxysilane(s) to the water. In particular, the greater the concentration of the reactants, the shorter the reaction time.

In one embodiment of the method according to the invention, the acid-stable solvent for the water can be any polar protic solvent including, but not limited to, any alcohol such as ethanol, methanol, butanol, n-propanol, isopropanol, and the like, and mixtures of these. More suitably, the alcohol is selected from ethanol, methanol, and mixtures of these. The use of alcohol allows for further additions of water and trialkoxysilanes to provide a continuous reaction. In this embodiment, the step of recovering the AMS or co-AMS from the reaction mixture can comprise separating the mixture of alkoxy-modified silsesquioxanes from the solid strong cationic catalyst by adding to the reaction mixture water and a nonpolar solvent for the silsesquioxanes and allowing phase separation of the water/alcohol and the nonpolar solvent. For example, it is suitable to add water to the reaction mixture with the nonpolar solvent, prior to phase separation, to dilute the solvent and allow any alcohol that may be soluble in the solvent to enter the water phase. Any remaining silsesquioxanes in the reaction mixture can be re-extracted with water and the nonpolar solvent.

The recovery of the mixture of alkoxy-modified silsesquioxanes from the nonpolar solvent phase can be accomplished by any known method such as, but not limited to, decantation of the nonpolar phase containing the AMS or co-AMS product, followed by drying in a warm vacuum oven, and the like, to remove the solvent and any water that may be present. The resulting AMS or co-AMS product is a liquid or a solid, suitably a highly viscous liquid and, more suitably, a slightly viscous liquid, substantially free of moisture, free alcohol and of residual acid catalyst. The solid strong cationic catalyst can easily be recovered from the reaction mixture as a precipitate in the water/alcohol phase, such as by filtration and the like, providing for its reuse in subsequent reactions.

Any nonpolar solvent for AMS or co-AMS product can be used to separate the product from the solid catalyst. Suitable nonpolar solvents include, but are not limited to, hexane, cyclohexane, benzene, toluene, and the like, and mixtures of these.

In another embodiment of the method, a polar aprotic solvent for the water can be used in place of the polar protic solvent. Suitable polar aprotic solvents include, but are not limited to, tetrahydrofuran (THF), 1,4-dioxane, 1,3-dioxolane, acetone, acetonitrile, diethyl ether, ethyl acetate, and the like, and mixtures of these. Such solvents are also solvents for the AMS and co-AMS products of the reaction. Therefore, it is not necessary to add a nonpolar solvent for the products to separate the products from the solid catalyst. Although it is recognized that acetone, ethyl acetate, and THF can very slowly react with the acid catalyst under certain conditions, no significant reaction of this type takes place under the conditions of time, temperature, and concentration of the acid employed in the invention methods.

The use of the solid catalyst in this embodiment is particularly efficient. Because of the solubility of the AMS or co-AMS products in the polar aprotic solvent, residual alkoxysiloxane groups can be minimized by extending the reaction time to allow further hydrolysis and condensation. In this embodiment, the method proceeds as above in steps (a) through (c). Recovery of the mixture of AMS or co-AMS products can be accomplished by any known method such as, but not limited to, decantation of the polar aprotic phase containing the AMS or co-AMS product, followed by drying in a warm vacuum oven, and the like, to remove the solvent and any water that may be present. Again, the resulting product is a liquid or a solid, suitably a highly viscous liquid and, more suitably, a slightly viscous liquid, substantially free of moisture, of free alcohol and of residual acid catalyst. The solid strong cationic catalyst can easily be recovered from the reaction mixture as a precipitate, such as by filtration and the like, providing for its reuse in subsequent reactions.

Suitable solid strong cationic hydrolysis and condensation catalysts for use in making the AMS or co-AMS products are commercially available and include, but are not limited to, cationic ion exchange resins that have sulfonic acid groups attached to an insoluble polymeric matrix. These solid resins contain a $H^+$ counter ion that is a strong cation exchanger due to its very low pKa (<1.0). As a non-limiting example, such cationic ion exchange resins can be prepared by sulfonating (by treating with sulfuric acid) a polystyrene that has been crosslinked with about 1 percent to about 8 percent divinylbenzene. Examples of suitable commercially available strong cationic exchange resins include, but are not limited to, the $H^+$ ionic form of Amberlite IR-120, Amberlyst A-15, Purolite C-100, and any of the Dowex® 50WX series resins. Such resins are typically gel beads having particle sizes of about 400 mesh to about 50 mesh. The particle size is not crucial in the methods of the invention. Other types of solid supports for the strong cationic ions have been described, such as, but not limited to, polymer strips, polymer membranes, and the like. Such alternative forms are within the scope of the invention, as claimed. Suitably, the solid strong cationic catalysts are in a physical form that, after the AMS or co-AMS products are extracted, will precipitate (or sink) to the bottom of the reaction chamber for simple separation from the reaction mixture, such as by filtration or the like.

It has been observed that new resins frequently contain free sulfuric acid that is present from the sulfonation procedure. This free acid can cause a high viscosity of the AMS or co-AMS product formed in the hydrolysis and condensation reaction. Therefore, it is desirable to remove this free acid by washing with water and a solvent for the water. By using a solvent for the water in addition to the wash water, it has been found that there is less residual water retained by the resin.

As described further below, it has been observed that a catalytic amount of the solid strong cationic catalyst used in the reaction can be as little as about 1% to about 50%, suitably about 5% to about 40%, of the molar amount of the acid and the trialkoxysilane used in the preparation.

The temperature at which the reaction takes place is not critical except that it be less than the boiling point of the solvent. For example, almost identical compositions of AMS or co-AMS product can be obtained from ambient temperature (about 25° C.) to about 60° C. to about 100° C. The expected rate enhancement of the reaction can be attained as the temperature increases. The AMS or co-AMS product can be observed as a cloudy residue that, if desired, can be progressively removed from the reaction mixture over a period of time until there is substantially total conversion of the reactants to the AMS or co-AMS product. Moreover, during the reaction, additional amounts of the trialkoxysilane reactants can be added, with water, to continuously yield product.

If a polar protic solvent for the water, such as alcohol, is used, the formation of the AMS or co-AMS can initially be observed as a cloudy solution which phase separates with increasing time. If a polar aprotic solvent, such as tetrahydrofuran (THF) is used, the AMS or co-AMS in the solvent is essentially clear. The phase containing the products, if desired, can be steadily removed from the reaction mixture over a period of time until there is substantially total conversion to the AMS or co-AMS products. Moreover, during the reaction, additional amounts of the trialkoxysilane reactants can be added, with water, to continuously yield product.

The period of time for total conversion of the reactants to the AMS or co-AMS product depends on the original concentration of the reactants, the solubility of the AMS or co-AMS in the solvent and the optional addition of reactants and/or applied heat during the process. However, if no additional reactants are used, the time can range from about 0.5 hours to about 200 hours, often about 0.75 hours to about 120 hours, or about one hour to about 72 hours. The time for total conversion is defined as the time elapsed until no further product can be removed by phase separation and no further product can be extracted from the reaction mixture by water and organic solvent, as described above.

Exemplary alkyltrialkoxysilane reactants in making the AMS products can include, but are not limited to, octyltriethoxysilane, octyltrimethoxysilane, cyclohexyltriethoxysilane, isobutyltriethoxysilane, ethyltrimethoxysilane, cyclohexyltributoxysilane, methyltriethoxy-silane, propyltriethoxysilane, hexyltriethoxysilane, heptyltriethoxysilane, nonyltriethoxy-silane, decyltriethoxysilane, 3-chloropropyltriethoxysilane, 3-chloropropyltrimethoxysilane, n-dodecyltrialkoxysilane, octadecyltriethoxysilane, methyltrimethoxysilane, propyl-trimethoxysilane, hexyltrimethoxysilane, heptyltrimethoxysilane, nonyltrimethoxysilane, octadecyltrimethoxysilane, 2-ethylhexyltriethoxysilane, and the like, and mixtures thereof.

Co-AMS compounds can be obtained by co-reacting any number of trialkoxysilanes such as, but not limited to, alkyltriethoxysilane and/or alkyltrimethoxysilanes, by hydrolysis and condensation with one or more other trialkoxysilanes that can provide one or more functional groups ($R^5X$, as defined above) on the AMS compound. As a non-limiting example, for use in rubber compounds, it may be desirable to produce a co-AMS compound containing a sulfur atom that can bind to an elastomer. Therefore, a suitable co-AMS compound can be manufactured by the co-hydrolysis and co-condensation of an alkyltrialkoxysilane with, for example, a mercaptoalkyltrialkoxysilane to introduce a mercaptoalkyl functionality, or with a blocked mercaptoalkyltrialkoxysilane to introduce a blocked mercaptoalkyl functionality. Examples of suitable sulfur-containing trialkoxysilanes include, but are not limited to mercapto-alkyltrialkoxysilanes, blocked mercaptoalkyltrialkoxysilanes, 3-thioacylpropyltrialkoxy-silane, 3-thiooctanoylpropyl-trialkoxysilane, a trialkoxysilane containing a chain of about 2 to about 8 sulfur atoms, and mixtures of these.

In this description the use of the term "blocked mercaptoalkyltrialkoxysilane" is defined as a mercaptosilane silica coupling agent that comprises a blocking moiety that blocks the mercapto part of the molecule (i.e. the mercapto hydrogen atom is replaced by another group, hereafter referred to as "blocking group") while not affecting the silica-reactive mercaptosilane moiety. Suitable blocked mercaptosilanes can include, but are not limited to, those described in U.S. Pat. Nos. 6,127,468; 6,204,339; 6,528,673; 6,635,700; 6,649,684; 6,683,135; the disclosures of which are hereby incorporated by reference with respect to the examples described. For purposes of this disclosure, the silica-reactive "mercaptosilane moiety" is defined as the molecular weight equivalent to the molecular weight of 3-mercaptopropyltriethoxysilane. A deblocking agent can be added during or after rubber compounding (e.g., later in the manufacturing process, such as during cure), after the silica-silane reaction has occurred, to allow the sulfur atom of the mercaptosilane to bond rapidly with the rubber. The deblocking agent can be added at any time during the compounding process as a single component during any mixing stage in which deblocking is desired. Examples of deblocking agents are well known to those skilled in the art.

The AMS or co-AMS products resulting from the catalyzed hydrolysis and condensation reaction can be observed as a multitude of peaks when measured, for example, by high pressure liquid chromatography (HPLC), $^{29}$Si nuclear magnetic resonance (NMR), and the like. The oligomers comprise a mixture of linear, branched and/or isomeric placements of the alkoxy modification. The collection of products is referred to as alkoxy-modified silsesquioxanes and/or co-alkoxy-modified silsesquioxanes. For example, these alkoxy-modified silsesquioxanes can include, but are not limited to, octyl alkoxy-modified silsesquioxanes, phenyl alkoxy-modified silsesquioxanes, 3-mercaptopropyl alkoxy-modified silsesquioxanes, 3-thioacylpropyl alkoxy-modified silsesquioxanes, and the like, and mixtures of any of these. Thus, the alkoxy-modified silsesquioxane(s) can comprise alkylalkoxy-modified silsesquioxanes, alkyl-co-mercapto alkoxy-modified silsesquioxanes, and the like, without limitation.

As non-limiting examples of trialkoxysilanes that can be used in the methods of the present invention, the formula weights of the original silane and the perfect silsesquioxane that would be expected to form from the total hydrolysis reaction are illustrated in Table 1.

TABLE 1

| R-Silane | Si—$X_3$ | R—Si$X_3$ (g/mol) | R—SiO$_{3/2}$ (g/mol) |
|---|---|---|---|
| octyl | triethoxy | 276.5 | 165.31 |
| 3-mercaptopropyl | trimethoxy | 196.3 | 127.23 |

TABLE 1-continued

| R-Silane | Si—X$_3$ | R—SiX$_3$ (g/mol) | R—SiO$_{3/2}$ (g/mol) |
|---|---|---|---|
| 3-thiooctanoylpropyl | triethoxy[a] | 364.6 | 253.44 |
| phenyl | triethoxy | 198.3 | 129.17 |

[a]NXT ™ (a blocked mercaptan from Crompton, Greenwich CT)

These values can be used along with the mole fractions of the silanes charged to determine the approximate theoretical yield for a desired AMS or co-AMS, when using the solid strong cationic catalyst in the hydrolysis and condensation reaction.

Table 2 illustrates a non-limiting example of kinetic runs including molar ratios of the various ingredients that can be used to produce the AMS or co-AMS products.

TABLE 2

| Run # | Solvent | OTES mol/L | HCl mol protons/L | Water mol/L |
|---|---|---|---|---|
| A | EtOH | 0.79 | 0.77 | 13.62 |
| B | EtOH | 0.40 | 0.40 | 13.99 |
| C | EtOH | 0.40 | 0.40 | 6.41 |
| D | MeOH | 0.40 | 0.40 | 6.39 |
| E | EtOH | 0.40 | 0.80 | 3.72 |
| F | EtOH | 0.80 | 0.40 | 7.00 |

For example, runs A-D use essentially equivalent molar ratios of OTES and acid; whereas run E uses a 2× molar amount of acid and run F uses a 0.5× molar amount of acid. Compared with runs A and B, runs C and D use about one-half the molar amount of water; run E uses about one-quarter the molar amount of water with a 2× molar amount of acid; and run F uses about one-half the molar amount of water, but the molar amount of OTES is doubled. It was observed that there was a steady increase in the amount of AMS formed in moles/L as the concentrations of the OTES, HCl and water increased (run A, data not shown). Further, the rate of reaction for the intermediate and high level of water (runs B, C and D) was about the same at a mole ratio of 0.40 mol/L OTES. Exchanging the ethanol with methanol showed about a two fold increase in the initial rate of product formation. The reduction of water to 3.7 mol/L (run E), even with a doubling of the HCl reduced the rate by about one-half, compared with run D (data not shown).

Extrapolating from these preliminary runs employing HCl as the strong acid, it can be seen that a molar catalytic amount of the protons present in the solid strong cationic catalyst used in the reactions according to the methods of the present invention suitably can be as little as about 1% to about 50% and, more suitably, about 5% to about 40% of the molar amount of the trialkoxysilane used in the preparation. Within the limits of practicality, there is virtually no lower or upper limitation on the molar concentrations of the reactants.

A feature of each of the AMS or co-AMS products produced is the presence of a reactive alkoxysilyl group "y" attached to one or more alkoxy-modified silsesquioxane "w" and/or "x" groups. In an AMS compound, either w or x but not both can be zero. In a co-AMS, w and x are not zero. The mole fraction of the one or more w or x groups is calculated as the mole fraction of w or x divided by the sum of the mole fractions w+x. Suitably, ratios of the w mole fraction (or the ratio of the x mole fraction) to the sum of the w+x fraction can range from about 0.01 to about 0.5. The mole fractions of w, x and y also can be measured through the mole fractions of $R^1$, $R^2$, and $R^3$ if the relative abundance of those groups can be measured. The sum of the mole fractions w, x and y is always equal to one, and y is not zero.

The individual weight fractions of w, x and y can be calculated from the mole fraction of each times their respective formula weight (FW) divided by the sum of the individual w, x and y weight fractions. For example, the weight percent of x (W % (x)) is calculated as $$W\ \%(x) = \frac{x(FW_x)}{x(FW_x) + w(FW_w) + y(FW_y)} \times 100$$

The weight percent of alcohol (HOR$^4$) can be calculated by the formula $$W\ \%(HOR^4) = \frac{3(FW_{HOR^4})}{x(FW_x) + w(FW_w) + y(FW_y)} \times 100$$

The alkoxy-modified silsesquioxanes made using these methods consist essentially of "open" structures having the reactive alkoxysilyl group and are essentially free of pure closed caged polyhedral organosilsesquioxanes (POSS) structures that are known for use as nanoparticle fillers in various compounds. For example, a nuclear magnetic resonance (NMR) analysis of the $^{29}$Si content of an exemplary oligomer mixture, as illustrated in the aforementioned patent application incorporated by reference, shows a broad range (in parts per million, ppm) from about −47 ppm to about −71 ppm. In comparison, NMR analysis of the $^{29}$Si content of a pure closed caged POSS structure shows a definitive peak at about −68 ppm. Without being bound by theory, it is believed that the method of preparation of the AMS and co-AMS products, as described above and as described in the aforementioned patent application, precludes or minimizes the formation of pure POSS structures because of the myriad of different geometric attachments that the rapid condensation of a trialkoxysilane generates. NMR spectra ranges for the amount of $^1$H and/or $^{13}$C in the products can also be determined, but these spectra will differ, depending on the various R groups attached to the structures, and are not illustrated here.

Another important feature of each of the AMS or co-AMS products produced is that the reactive alkoxysilyl group is present at such a low level that only a small amount of alcohol can be liberated by hydrolysis of the product. That is, the y alkoxysilyl group generates only about 0.05% to about 10% by weight alcohol when the product is treated by substantially total acid hydrolysis. Suitably, the amount of generated alcohol is about 0.5% to about 8% by weight and, more suitably, the amount of generated alcohol is about 1% to about 6% by weight.

The amount of residual reactive alkoxysilyl groups in each of the final AMS or co-AMS products can be measured by the amount of alcohol recoverable from the product, according to the method published in Rubber Chemistry & Technology 75, 215 (2001). Briefly, a sample of the product is treated by total acid hydrolysis using a siloxane hydrolysis reagent (0.2 N toluenesulfonic acid/0.24 N water/15% n-butanol/85% toluene). This reagent quantitatively reacts with residual ethoxysilane (EtOSi) or methoxysilane (MeOSi), freeing a substantially total amount of ethanol or methanol that is then measured by a headspace/gas chromatographic technique, and expressed as the percentage by weight in the sample.

Therefore, the AMS or co-AMS product(s) produced are very suitable for use in rubber compositions in which silica is employed as a reinforcing filler. In particular, the reactive alkoxysilane group(s) attached to the AMS or co-AMS products can participate in the alkoxysilane-silica reaction and can improve silica dispersion in the rubber. Therefore, the AMS or co-AMS product(s), including those made by a method of according to the invention, can be used to form a vulcanizable rubber compound comprising (a) an elastomer; (b) a reinforcing filler comprising silica or a mixture thereof with carbon black; (c) a silica dispersing aid comprising an alkoxy-modified silsesquioxane obtained by the method according to the invention, wherein the alkoxy-modified silsesquioxane is substantially free of residual acid catalyst; and (d) a cure agent. The disclosure of the aforementioned patent application regarding other additives that can be included in the vulcanizable rubber compound, is hereby incorporated by reference.

As discussed above, the alkoxysilane-silica reaction produces alcohol as a by-product when alkyltrialkoxysilanes and/or alkoxysilane-terminated polymer groups are used for silica dispersion in rubber compounds. Usually, the trialkoxysilane employed is a triethoxysilane or a trimethoxysilane, and the generated alcohol is ethanol or methanol, respectively. Because these alcohol emissions add to the VOC emissions generated from processing of the other rubber tire components, the amount of reinforcing silica and concomitant amount of trialkoxysilane employed is governed and limited by government environmental regulations.

The limited amount of alcohol that is available in the AMS or co-AMS product(s) make these compounds very useful in rubber compounds because they have the potential to significantly reduce the level of potential VOCs emitted as alcohol during compounding and further processing. Moreover, the limited amount of available unreacted alkoxysilane groups during and after mixing, severely limit the degree of blistering in the vulcanized rubber compounds and tires made from them. The use of the products made according to the method of the invention also allow a significant increase in the amount of silica used for reinforcement.

The use of the AMS and/or co-AMS products, including the improved products made by a method according to the invention, in rubber compounds not only minimizes alcohol emissions during compounding and further processing of the rubber, but these products also perform well as silica dispersing agents, giving improved physical properties to the stocks containing the compounds.

The vulcanized rubber compounds containing the improved AMS and/or co-AMS compounds made by a method according to the present invention can be utilized to form products such as power belts, and treadstocks for pneumatic tires. The composition can also be used to form other elastomeric tire components such as subtreads, sidewalls, body ply skims, bead fillers, apex, chafer, sidewall insert, wirecoat, inner liner, and the like, without limitation.

EXAMPLES

The following examples illustrate methods of preparation of representative alkoxy-modified silsesquioxanes employing a solid strong cationic resin as the hydrolysis and condensation catalyst. However, the examples are not intended to be limiting, as other alkoxy-modified silsesquioxanes, alone or in combination, can be prepared according to the described methods. Moreover, the methods are exemplary only and other methods for preparing the alkoxy-modified silsesquioxanes employing other solid strong cationic catalysts can be determined by those skilled in the art without departing from the scope of the invention herein disclosed and claimed.

Example 1

Preparation of N-Octyl Alkoxy-Modified Silsesquioxane (Octyl-AMS) Using Dowex 50WX2-200 Resin To a 500 mL Erlenmeyer flask was added 9.23 grams (44.3 mmol of $H^+$) of dry Dowex 50WX2-200 (a strong cationic polystyrene resin crosslinked with 2% divinylbenzene and having sulfonic acid as the functional group, 200 mesh particles), 238 mL of absolute ethanol and 27.95 grams (1.613 mol) of distilled water. When the resin was uniformly dispersed, 41.36 grams (150 mmol) of octyltriethoxysilane (OTES) was added. The molar ratio of the silane to the $H^+$ of the resin was about 30:1. After stirring for 17 hours, the AMS produced coated the resin as a lower phase. The addition of 260 mL of cyclohexane and 260 mL of water gave the AMS in the upper phase and the resin as a precipitate in the lower aqueous phase. Recovery of the resin by filtration and drying gave 6.91 grams (75% of the original amount). The AMS was recovered as a high viscosity material by evaporation of the solvent to give 24.56 grams (98% of the theoretical yield, TY).

Example 2

Preparation of Octyl-AMS Using Recovered Dowex 50WX2-200 Resin

The procedure according to Example 1 was repeated, except that 6.91 grams (33.2 mmol of $H^+$) of recovered Dowex-50WX2-200 (from Example 1) was used in 160 mL of absolute ethanol, 21.14 grams (1.22 mol) of water and 28.24 grams (102 mmol) of OTES. The resin in the initial reaction mixture compressed within 3 hours to less than 50% of the original dispersed volume as the AMS formation coated the particles. After stirring for 24 hours, cyclohexane and water was added to isolate 17.46 grams (103.4% TY) of a less viscous AMS.

Example 3

Preparation of Octyl-AMS Using Dowex 50WX2-200 Resin that was Previously Washed to Remove Excess Free Sulfonic Acid The Dowex resin was twice washed with THF and water to remove the free sulfuric acid that is present in new resin. This free acid was thought to be the cause of the high viscosity AMS that was produced in the preparations according to Examples 1 and 2. Thus, 15.39 grams of the Dowex resin (containing 73.9 mmol of sulfonic acid, as measured by thermoanalysis) was dispersed in 150 mL of THF containing 15 mL of water. The mixture was stirred, decanted and washed a second time with the THF and water. The mixture was then rinsed once more with THF. The amount of sulfonic acid and water remaining in the catalyst slurry was measured and subsequent charges of water and THF in the reaction mixture to produce AMS were adjusted accordingly.

The reaction mixture was run according to Example 1, with the washed Dowex resin, 182 mL of THF, 24.65 grams (1.77 mol) of water and 41.2 grams (149 mmol) of OTES. The mixture was stirred for 24 hours and filtered to recover the resin (12.07 grams). Evaporation of the THF yielded 24.67 grams of a desired slightly viscous AMS.

Example 4

Determination of Latent Ethanol in the AMS Produced in Example 3

Prior to separating the AMS from the THF solution in Example 3, a sample of the solution was analyzed for ethanol by head space gas chromatography. The average of 8.30% ethanol measured within one hour of reaction time compared favorably to the 9.03% theoretical amount of ethanol that a complete reaction would produce (92% of the TY of ethanol was obtained). Analysis of the AMS product obtained after 24 hours of reaction time showed 0.238% latent ethanol.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A reaction mixture comprising:
   (i) water;
   (ii) an acid-stable solvent for the water;
   (iii) a solid strong cationic hydrolysis and condensation catalyst; and
   (iv) an R-trialkoxysilane;
      wherein R comprises a group bonded to the silicon atom and is independently selected from the group consisting of $R^1$, $R^2$ and $R^3$, wherein $R^1$, $R^2$ and $R^3$ are independently selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, and (iv) $R^5X$, wherein X is selected from the group consisting of Cl, Br, SH, $S_aR^6$, $NR^6_2$, $OR^6$, $CO_2H$, $CO_2R^6$, $SCOR^6$, OH, olefins, epoxides, amino groups, vinyl groups, acrylates and methacrylates, wherein a=2 to about 8, $R^5$ is selected from the group consisting of alkylene groups having one to about 20 carbon atoms, cycloalkylene groups having 3 to about 20 carbon atoms, and $R^4$ and $R^6$ are selected from the group consisting of alkyl groups having one to about 5 carbon atoms, cycloalkyl groups having 3 to about 20 carbon atoms, and alkylaryl groups having 7 to about 20 carbon atoms;
      wherein the reaction mixture forms alkoxy-modified silsesquioxanes that consist essentially of a mixture of alkoxy-modified silsesquioxanes having an open structure with a reactive alkoxysilyl group, and are essentially free of closed caged polyhedral organosilsesquioxanes.

2. The reaction mixture of claim 1, wherein the mixture of alkoxy-modified silsesquioxanes liberates about 0.05% to about 10% by weight alcohol when treated by substantially total acid hydrolysis.

3. The reaction mixture of claim 1, where the reaction mixture is exclusive of a liquid catalyst.

4. The reaction mixture of claim 1, wherein no treatment of the mixture of alkoxy-modified silsesquioxanes is performed to remove liquid catalyst.

5. The reaction mixture of claim 1, wherein the mixture of alkoxy-modified silsesquioxanes liberates about 0.5% to about 8% by weight alcohol when treated by substantially total acid hydrolysis.

6. The reaction mixture of claim 1, wherein the mixture of alkoxy-modified silsesquioxanes liberates about 1% to about 6% by weight alcohol when treated by substantially total acid hydrolysis.

7. The reaction mixture of claim 1, wherein at least one of the $R^1$, $R^2$ and $R^3$ groups of the alkoxy-modified silsesquioxane is a group that can bind to an elastomer.

8. The reaction mixture of claim 1, wherein the at least one of the $R^1$, $R^2$ and $R^3$ groups is selected from the group consisting of a mercaptoalkyl group and an organo group containing a chain of about 2 to about 8 sulfur atoms.

9. The reaction mixture of claim 1, wherein at least one of the alkoxy-modified silsesquioxanes comprises an alkyl alkoxy-modified silsesquioxane.

10. The reaction mixture of claim 9, wherein the alkyl alkoxy-modified silsesquioxane is selected from the group consisting of octyl alkoxy-modified silsesquioxanes, 2-ethylhexyl alkoxy-modified silsesquioxanes, phenyl alkoxy-modified silsesquioxanes, 3-chloropropyl alkoxy-modified silsesquioxanes, 3-mercaptopropyl alkoxy-modified silsesquioxanes, and mixtures thereof.

11. The reaction mixture of claim 9, wherein the alkyl alkoxy-modified silsesquioxane comprises an alkyl-co-mercapto alkoxy-modified silsesquioxane.

12. The reaction mixture of claim 1, wherein the mixture of alkoxy-modified silsesquioxanes is substantially free of moisture and free alcohol.

13. A reaction mixture comprising:
   (i) water;
   (ii) an acid-stable solvent for the water;
   (iii) a solid strong cationic hydrolysis and condensation catalyst; and
   (iv) an R-trialkoxysilane;
   wherein R comprises a group bonded to the silicon atom and is independently selected from the group consisting of $R^1$, $R^2$ and $R^3$, wherein $R^1$, $R^2$ and $R^3$ are independently selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, and (iv) $R^5X$, wherein X is selected from the group consisting of Cl, Br, SH, $S_aR^6$, $NR^6_2$, $OR^6$, $CO_2H$, $CO_2R^6$, $SCOR^6$, OH, olefins, epoxides, amino groups, vinyl groups, acrylates and methacrylates, wherein a=2 to about 8, $R^5$ is selected from the group consisting of alkylene groups having one to about 20 carbon atoms, cycloalkylene groups having 3 to about 20 carbon atoms, and $R^4$ and $R^6$ are selected from the group consisting of alkyl groups having one to about 5 carbon atoms, cycloalkyl groups having 3 to about 20 carbon atoms, and alkylaryl groups having 7 to about 20 carbon atoms;
   wherein the reaction mixture forms a mixture of alkoxy-modified silsesquioxanes wherein the mixture of alkoxy-modified silsesquioxanes liberates about 0.05% to about 10% by weight alcohol when treated by substantially total acid hydrolysis.

14. The reaction mixture of claim 13, where the reaction mixture is exclusive of a liquid catalyst.

15. The reaction mixture of claim 13, wherein no treatment of the mixture of alkoxy-modified silsesquioxanes is performed to remove liquid catalyst.

16. The reaction mixture of claim 13, wherein the mixture of alkoxy-modified silsesquioxanes liberates about 0.5% to about 8% by weight alcohol when treated by substantially total acid hydrolysis.

17. The reaction mixture of claim 13, wherein the mixture of alkoxy-modified silsesquioxanes liberates about 1% to about 6% by weight alcohol when treated by substantially total acid hydrolysis.

18. The reaction mixture of claim 13, wherein at least one of the $R^1$, $R^2$ and $R^3$ groups of the alkoxy-modified silsesquioxane is a group that can bind to the elastomer.

19. The reaction mixture of claim 13, wherein the at least one of the $R^1$, $R^2$ and $R^3$ groups is selected from the group consisting of a mercaptoalkyl group and an organo group containing a chain of about 2 to about 8 sulfur atoms.

20. The reaction mixture of claim 13, wherein the mixture of alkoxy-modified silsesquioxanes is substantially free of moisture and free alcohol.

21. A method of making a rubber composition comprising reacting:
(i) water;
(ii) an acid-stable solvent for the water;
(iii) a solid strong cationic hydrolysis and condensation catalyst; and
(iv) an R-trialkoxysilane;
wherein R comprises a group bonded to the silicon atom and is independently selected from the group consisting of $R^1$, $R^2$ and $R^3$, wherein $R^1$, $R^2$ and $R^3$ are independently selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, and (iv) $R^5X$, wherein X is selected from the group consisting of Cl, Br, SH, $S_aR^6$, $NR^6_2$, $OR^6$, $CO_2H$, $CO_2R^6$, $SCOR^6$, OH, olefins, epoxides, amino groups, vinyl groups, acrylates and methacrylates, wherein a=2 to about 8, $R^5$ is selected from the group consisting of alkylene groups having one to about 20 carbon atoms, cycloalkylene groups having 3 to about 20 carbon atoms, and $R^4$ and $R^6$ are selected from the group consisting of alkyl groups having one to about 5 carbon atoms, cycloalkyl groups having 3 to about 20 carbon atoms, and alkylaryl groups having 7 to about 20 carbon atoms;
wherein the reaction mixture forms the mixture of alkoxy-modified silsesquioxanes wherein the mixture of alkoxy-modified silsesquioxanes liberates about 0.05% to about 10% by weight alcohol when treated by substantially total acid hydrolysis; and
combining the mixture of alkoxy-modified silsesquioxanes with
an elastomer and
a filler.

* * * * *